United States Patent [19]

Scholl et al.

[11] 4,119,048
[45] Oct. 10, 1978

[54] TEMPLATE CONTROL FOR SEWING MACHINES

[75] Inventors: Hans Scholl, Oerlinghausen-Lipperreihe; Horst Bernewasser, Steinhagen, both of Fed. Rep. of Germany

[73] Assignee: Kochs Adler AG, Bielefeld, Fed. Rep. of Germany

[21] Appl. No.: 776,545

[22] Filed: Mar. 11, 1977

[51] Int. Cl.$^2$ .............................. D05B 21/00
[52] U.S. Cl. .............................. 112/121.12; 33/23 K; 33/176; 82/14 R; 74/568 R
[58] Field of Search ............ 112/121.12, 121.11, 112/121.15, 102; 144/144.5 R, 144.5 GT; 33/23 K, 175, 176, 174 G, 174 PA, 174 PB; 82/14 R; 74/568 R

[56] References Cited

U.S. PATENT DOCUMENTS 3,774,558  11/1973  Scholl et al. .................. 112/121.12

FOREIGN PATENT DOCUMENTS 1,951,056  4/1971  Fed. Rep. of Germany ...... 112/121.12
1,924,938  11/1970  Fed. Rep. of Germany ...... 112/121.12
2,403,945  7/1975  Fed. Rep. of Germany ...... 112/121.12

Primary Examiner—H. Hampton Hunter
Attorney, Agent, or Firm—Max Fogiel

[57] ABSTRACT

A template control for relative movement between a workpiece or material and a tool which may be in the form of a needle on processing machines. The template is adjustable to different shape and/or size of a workpiece which may be in the form of a garment. A roller is pressed against the template which is provided with a coaxially located and driven gear pinion. The pinion meshes with teeth adaptable to the shape of the template for purposes of guiding the roller without slippage along the template. The latter has an elastic tape which determines the shape of the contour. The tape is held in a number of tape carriers arranged displaceably next to one another and parallel to one another. Displaceable tooth segments under tension of a spring, are associated with the tape carriers. These tooth segments when located next to one another, form a gear rack with identical toothing. The template may have a large number of segments which are displaceable relative to one another and carry the track for the segments pressed against the roller. Each of the segments is assigned to one tooth segment which is under the tension of the spring and is displaceable relative to the segments.

6 Claims, 10 Drawing Figures

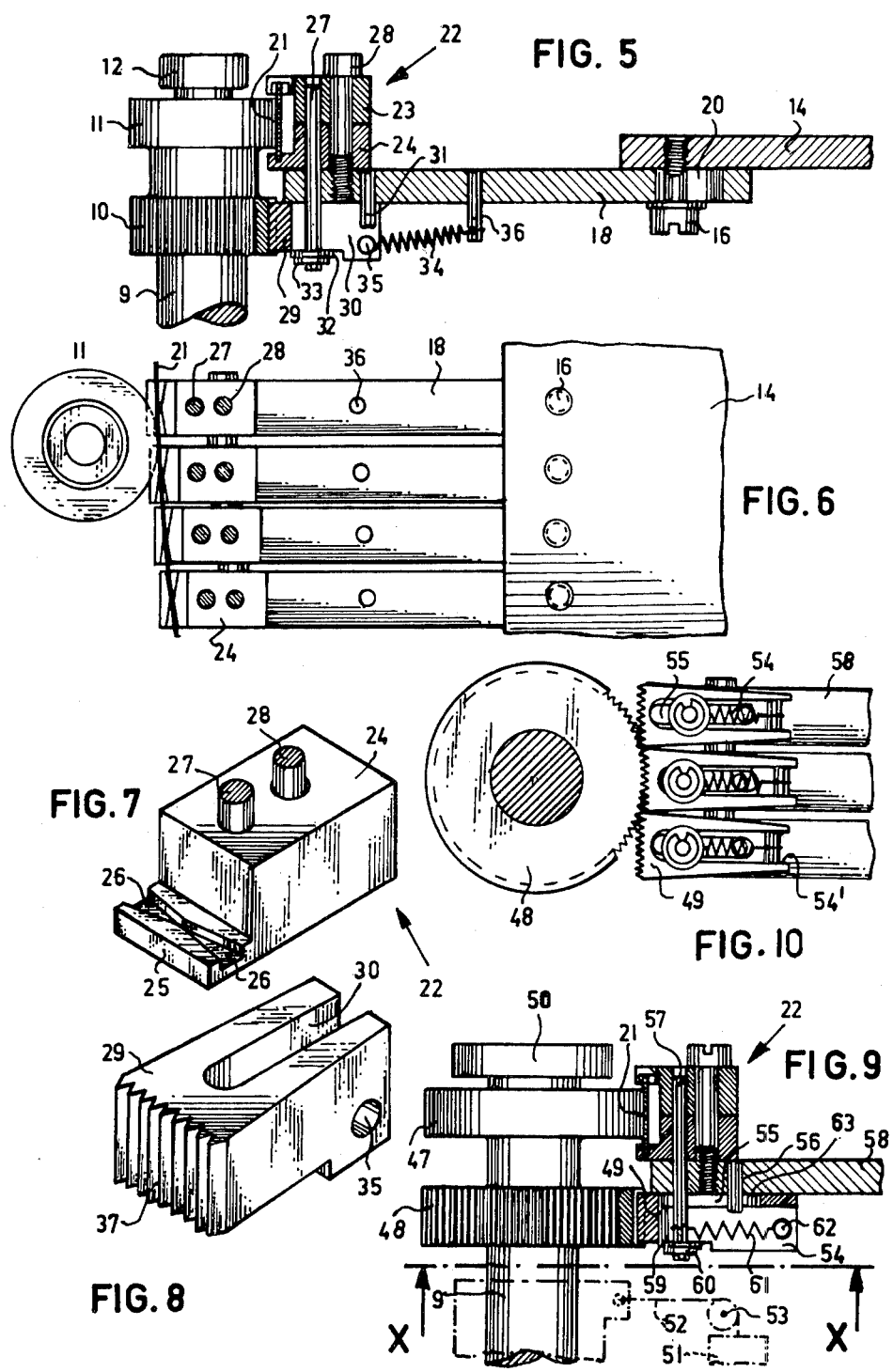

TEMPLATE CONTROL FOR SEWING MACHINES

BACKGROUND OF THE INVENTION

The present invention relates to template control for the relative moment between material and tool (needle) on processing machines, particularly sewing machines, in which a template can be adjusted to the different shape and/or size of a workpiece (garment). A roller is pressed against this template which is equipped with a gear pinion located and driven coaxially. This pinion meshes with teeth adaptable to the shape of the template in order to guide the roller without slipping along the template.

It is the object of the present invention to provide a template for sewing machines, thus facilitating the adjustment to different garment (material) contours and assuring the safe non-slip roll-off of the roller pressed against the template.

From the German Utility Pat. No. 1 998 372, there is already known a template for sewing parts of similar garments of different size whose guide is moved through a guide groove corresponding to the contour of the seam in a base plate of the template and along it by means of a gear rack, with the teeth located on various portions of the guide groove on parts whose position relative to the base plate is variable. This template provides a non-slip roll-off of the scanning means, but a change of the garment shape can be carried out only by proper change of the guide groove and the gear rack so that the template is suited only for the sewing of similar garments of different length.

There is also known from the German Laid-Open Document 21 50 197 a template for use in sewing machines for sewing garments of different shape and/or size and which is located on a support plate and is traced by a driven roller pressed against the template. The template comprises a large number of individual segments, displaceably fastened to the support plate and forming the contact surface for the driven magnet roller. At those points on the templates where the magnet roller undergoes an angular change in direction there are toothed segments meshing with a gear pinion located coaxially with the magnet roller and driven by it, in order to prevent idling of the roller at these locations.

This known template makes it possible to process garments of different length and, within certain limits, different shape without replacing (interchanging) template parts. However, a slip of the magnet rollers due to the absence of teeth extending throughout the entire profile of the template cannot always be prevented, especially when the mass to be moved by means of the magnet roller is large.

From the German Laid-Open Document No. 2403945 there is already known a driven gear pinion for guiding a sewing machine along a template conforming to the seam contour; this template comprises mutually displaceable and toothed portions located in at least two planes; this template is contacted under pressure by the gear pinion whose drive shaft mounts an auxiliary gear pinion which can be rotated from its normal position in either direction by half a tooth width, and is turned together with the gear pinion. The toothed template causes a nonslip tracing of the template profile, and makes possible a continuously variable adjustment to the different garment length. However, any change to another shape requires the preparation of a toothed template depending on the required shape.

It is the object of the present invention to provide a template control of the initially-mentioned type and which makes possible not only a nonslip travel of the roller pressed against the template, but also a continuously variable adjustment to another garment shape without replacing template parts.

Another object of the present invention is to provide a template control of the foregoing character which is simple in construction and may be economically fabricated.

A further object of the present invention is to provide a template control, as described, which may be readily maintained in service, and which has a substantially long operating life.

SUMMARY OF THE INVENTION

The objects of the present invention are achieved by providing that the template comprises an elastic tape which determines the shape of the contour. This tape is held in a number of tape carriers arranged displaceably next to one another and parallel to one another. Displaceable toothed segments under spring tension are associated with the tape carriers. These toothed segments, located next to one another form a gear rack with identical toothing. The template may simultaneously have a large number of segments which are displaceable relative to one another and carry the track for the segments pressed against the roller. Each of the segments is assigned a toothed segment which is under the tension of a spring and is displaceable relative to the segments.

With a template control where the roller is pressed under the influence of a magnet against the tape or the segments, the toothed segments are drawn successively against spring tension into the field of action of the gear pinion, which is also under the influence of a magnet and is rotating. After demeshing, the toothed segments are returned to their initial position under the effect of the spring.

With template control where the roller is pressed against the tape or the segments by means of mechanical means as for example, a weight, each toothed segment is under spring tension and meshes with the gear pinion in this condition.

The tape carriers holding the tape and the segments are mounted on supporting bodies which are displaceably and fixably mounted on a base plate for adjustment to another shape, with the toothed segments moveably located on the supporting bodies.

To maintain uniformity of the seam, deflectors are provided in the region of adjacent tape carriers and segments; these deflectors are fastened to the segments and act jointly with a loose roller located on the driveshaft for the roller and the gear pinion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a section taken along line V—V of FIG. 2;

FIG. 6 is a partial top view of the tape carriers with the elastic tape, partial in section;

FIG. 7 is a perspective view of a feature of a tape carrier, on an enlarged scale;

FIG. 8 is a perspective view of a toothed segment, on an enlarged scale;

FIG. 9 is a modified template control according to FIG. 5; and

FIG. 10 is a section taken along line X—X of FIG. 9.

DESCRIPTION OF THE PREFERRED TWO EMBODIMENTS

Figure 1:
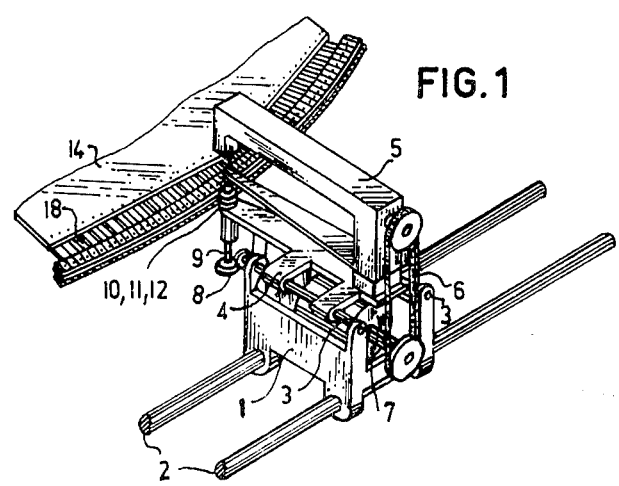
FIG. 1 is a perspective partial view of a sewing unit provided with a template control and a sewing machine moveable in two directions.

Referring to FIG. 1, the sewing unit is provided with a support 1 which is displaceably supported on two bars 2. Vertically received in the support 1 with respect to the bars 2, are two further sliding bars 3, on which a base plate 4 is displaceably supported. On the base plate 4 is located a sewing machine 5 driven by a motor 7 via a V-belt 6. Moreover, the motor drives via a clutch (not shown), a reversing gear and two bevel gears 8, a vertical shaft 9, which is pivoted in the base plate 4 and extending coaxially with the reciprocating needle of the sewing machine 5.

Figure 3:
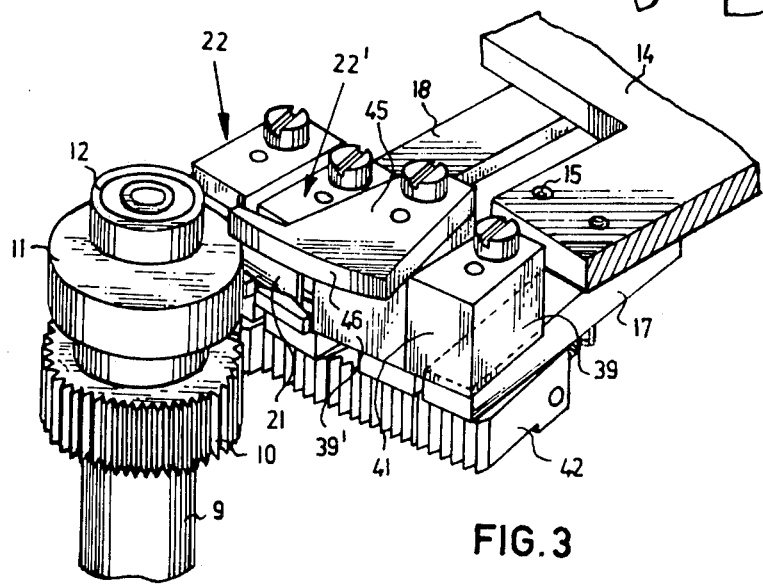
FIG. 3 is a perspective partial view of FIG. 2 when viewed in the direction of arrow III in FIG. 2.

On the shaft 9 there are located a gear pinion 10 (FIGS. 3 and 5), a roller 11 and a loose roller 12, which are magnetizable in order to cooperate with a template 13 (FIG. 1).

Figure 4:
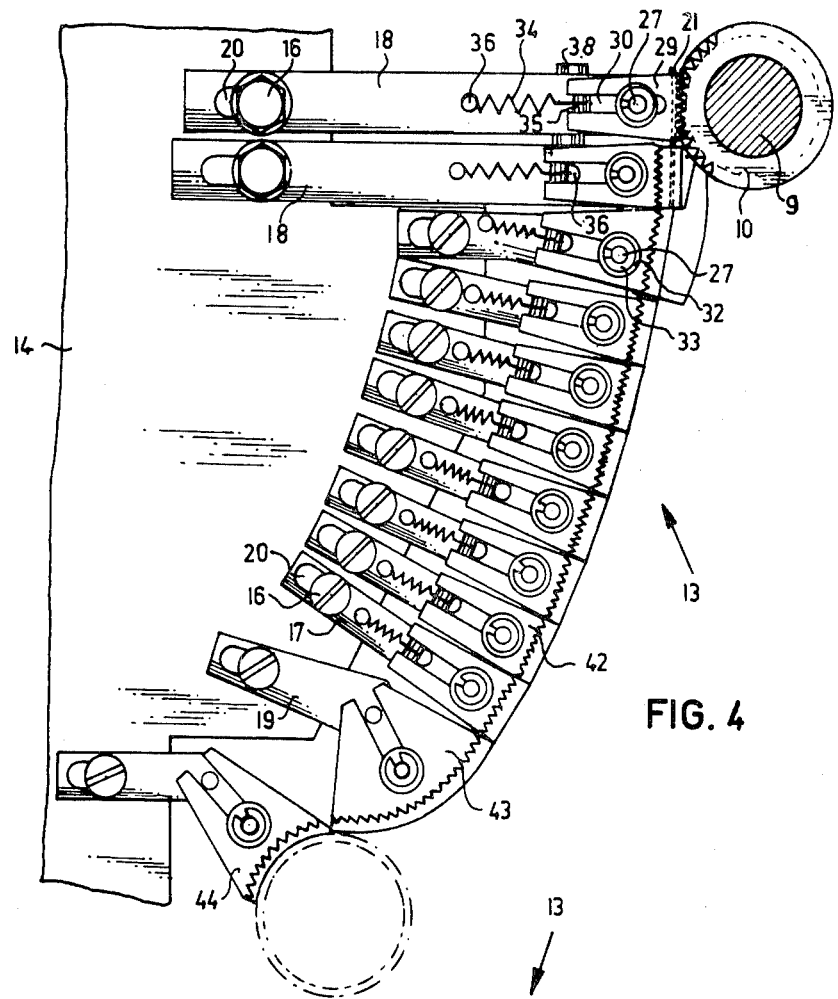
FIG. 4 is a bottom view of FIG. 2.

The template 13 is provided with a supporting plate 14 having a plurality of tapholes 15 for receiving screws 16 (FIG. 4) by means of which a plurality of supporting bodies 17, 18, 19 are secured to the supporting plate 14. The supporting bodies 17 to 19 are provided with oblong holes 20 (FIGS. 4 and 5) adapted to be displaceably arranged on the supporting plate.

The supporting bodies 18 are provided for carrying an elastic tape 21 (FIGS. 5 and 6) serving as a rolling surface for the magnetic roller 11. The tape 21 is received by tape carriers 22 comprising two uniform carrier halves 23, 24, a projection 25 (FIG. 7) of which is provided with two recesses 26 each forming a wedge with respect to the center. The two carrier halves 23, 24 are secured to the supporting body 18 by means of a pin 27 and a screw 28.

At the bottom surface of each supporting body 18 is located a toothed segment 29 (FIGS. 4, 5 and 8) formed with a recess 30 therethrough into which project the pin 27 with some lateral clearance and a guide pin 31. The toothed segment 29 is secured to the supporting body 18 by means of a disc 32 and a clamping ring 33 located on the pin 27. Futhermore, the toothed segment 29 is under the tension of a tension spring 34 supported on a pin 35 overbridging the recess 30 of the toothed segment 29, and a pin 36 inserted into the supporting body 18. The tension spring 34 keeps the toothed segment 20 out of engagement with the gear pinion 10. The shape of the toothed segments 29 narrows with respect from the toothed surface 37. When arranged side by side the toothed surfaces 37 of the toothed segments 29 form a toothed rack having a continuously uniform toothing.

Figure 2:
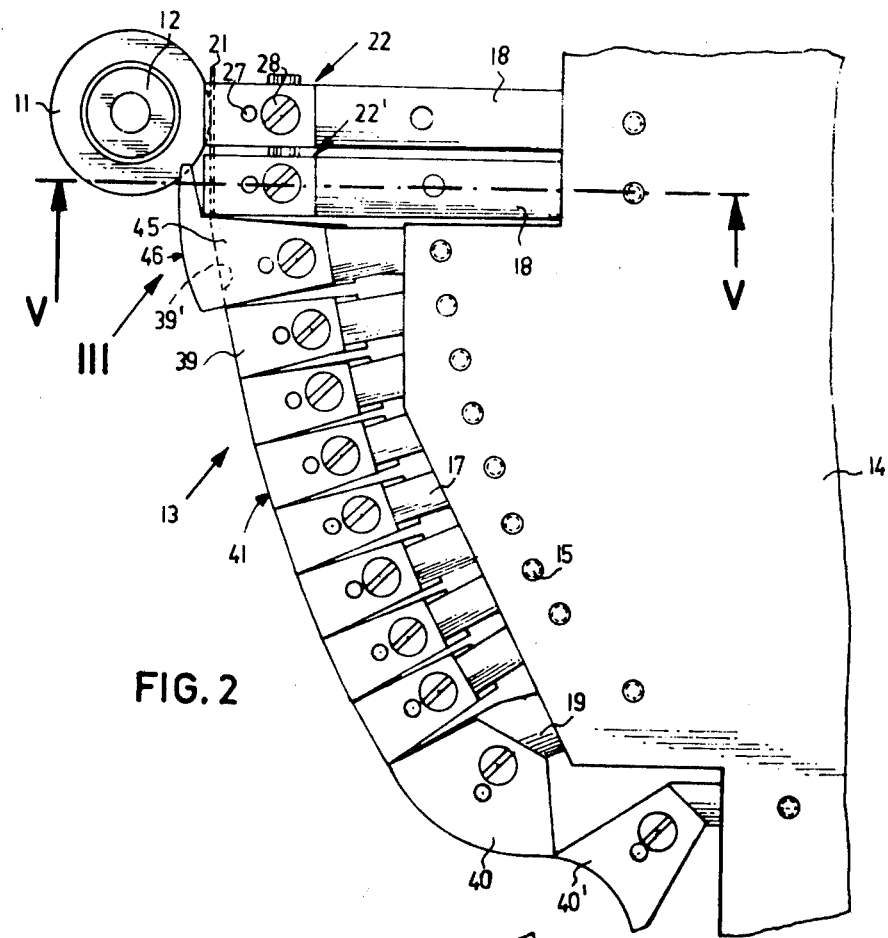
FIG. 2 is a partial top view of the template and a roller pressed against the template by magnetic attraction.

At one side of each supporting body 18, there is arranged a spacer 38 against which bears the other side of an adjacent supporting body 18. The supporting bodies 17 and 19 (FIGS. 2 to 4) are not provided with tape carriers 22 but with segments 39, 39', 40, 40', the adjoining front surfaces of which form the running surface for the magnetic roller 11. Assigned to the contour of each segment 39, 39', 40, 40' is a toothed segment 42, 43, 44. The toothed segments 42 are also under the tension of a spring as already described.

Secured to the segment 39a adjacent to the tape carrier 22a is a deflector 45, which is formed with a front surface 46 serving as a running surface for the loose roller 12 disposed on the vertical shaft 9.

In conjunction with the modified embodiment according to FIGS. 9 and 10, pressing of the roller 47 against the tape 21, of the gear pinion 48 against the toothed segments 49 or of the loose roller 50 against the deflector (not shown in the aforesaid FIGS.) is effected by means of a weight 51 hanging on a rope 52. The rope 52 is guided by a roller 53 pivoted at the support 1 and engages the base plate 4.

The toothed segments 49 are provided with a recess 54 and an oblong hole 55 through which projects a guide pin 56 and a pin 57. A disc 50 and a locking plate 60 located on the pin 57 serve for securing the toothed segment 49 to a supporting body 58.

A tension spring 61 is supported between pin 57 and a pin 62 bridging the recess 54, and effects, that the toothed segment 49 is drawn into the direction of the path of motion of the gear pinion 48, at which the edge 63 of the oblong hole 55 (FIG. 9) rests against the guide pin 56.

Operation of the template control can be described as follows:

In operation of the template control, the shape of the seam to be formed by the sewing machine 5 (FIG. 1) is determined by the shape of the elastic tape 21 and the segments 39, 39', 40, 40'. The course of curves can be defined in limits by displacing the supporting bodies 17 to 19 on the supporting plate 14.

After guiding the magnetic roller 11 against the elastical tape 21 of the template 13 and after switching on the device, not only the roller 11 is pressed against the tape 21 by the entering magnetic attraction, but also the toothed segment 29, which at times is in the effective range of the magnetic field produced by the magnetic force of the gear pinion 10, and is drawn against the teeth of the gear pinion 10 against the tension of the tension spring 34. When switching on the motor 7 (FIG. 1), the magnetic roller 11 rolls on the tape 21 and its feed is favored by the toothed segments 29 which are meshing one after another with the gear pinion 10 and forming a toothed rack with a continuously uniform toothing. This results in a nonslip movement of the roller 11 and thus also of the support 1 together with the sewing machine 5 and the motor 7, which form a considerable mass.

When the roller 11 passes over from the tape carrier 22' carrying one end of the tape 21, to its adjacent segment 39', the roller 11 is guided no longer by the tape 21 but by the deflector 45, the front surface 46 of which is formed in such a manner, that, when the loose roller 12 passes over to the front surface 46, the end of the tape 21 located in the tape carrier 22', is not longer in contact with the magnetic roller 11.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A template control for relative movement between a workpiece and a tool on processing machines comprising:
   a template including
   a supporting plate,
   a plurality of supporting bodies displaceably secured next to one another and parallel to one another on said supporting plate,
   a plurality of tape carriers fastened to said supporting bodies, and
   an elastic tape carried by said tape carriers for determining the shape of a contour of said template; toothed segments shiftably secured to each of said supporting bodies; spring means between said toothed segments and said supporting bodies for holding said toothed segments in an initial position;
   a roller for following the contour of said template;
   a gear pinion coaxially connected with said roller;
   a drive shaft carrying said roller and said gear pinion; and
   means for pressing said roller against said elastic tape and for engaging
   said gear pinion with said toothed segments located next to one another for forming substantially a gear rack when said toothed segments are in operating position.

2. The template control as defined in claim 1 wherein said template additionally comprises:
   a plurality of further supporting bodies displaceably secured to said supporting plate,
   a plurality of segments having a front surface and secured next to one another and to said further supporting bodies for forming a further contour part of said template,
   further toothed segments shiftably secured to each of said supporting bodies, and further
   spring means between said further toothed segments and said further supporting bodies for holding said segments in an initial position.

3. The template control as defined in claim 1, wherein said template additionally comprises:
   a plurality of further supporting bodies displaceably secured to said supporting plate;
   a plurality of segments having a front surface and secured next to one another to said further supporting bodies for forming a further contour part of said template;
   further toothed segments shiftably secured to each of said further supporting bodies, and
   further spring means between said further toothed segments and said further supporting bodies for holding said segments in an initial position;
   said template control further including
   magnetic means for producing magnetic fields on said roller and said gear pinion comprising said means for pressing said roller against said tape and said segments having said front surface, and for shifting said toothed segments successively corresponding to translational movement of said roller out of initial positions and against the action of said spring means into engaging action with said gear pinion when said toothed segments are in an effective area of the magnetic field on said gear pinion.

4. The template control as defined in claim 1, wherein said means for pressing said roller against said tape comprises weight-loaded friction means, said toothed segments being pressed against said gear pinion by means of said spring means when said gear pinion meshes with the teeth of said toothed segments.

5. A template control for use in a sewing device comprising:
   a sewing machine having a reciprocating needle;
   supporting means for said sewing machine and permitting movement of said sewing machine in two directions;
   a template including
   a supporting plate,
   a plurality of supporting bodies displaceably secured next to one another and parallel to one another on said supporting plate,
   a plurality of tape carriers fastened to said supporting bodies,
   an elastic tape carried by said tape carriers for determining the shape of a contour of said template, and
   a plurality of segments having a front surface and secured next to one another to said supporting bodies, for forming a further contour part of said template,
   toothed segments shiftably secured to each of said supporting bodies;
   spring means between said toothed segments and said supporting bodies for holding said segments in an initial position;
   a drive shaft coaxially with said needle;
   a roller secured to said drive shaft for following the contour of said template;
   a gear pinion coaxially connected with said roller; and
   means for pressing said roller against said elastic tape and for engaging said gear pinion with said toothed segments located next to one another and forming a gear rack with uninterrupted toothing.

6. The template control as defined in claim 5, further comprising
   a loose roller on said drive shaft, and
   deflecting means having a front surface for cooperating with said loose roller and fastened to said segments having a front surface and in proximity of adjacent tape carriers and said segments, for maintaining uniformity of a seam of said sewing machine.

* * * * *